United States Patent
Menezes et al.

[11] Patent Number: 6,149,271
[45] Date of Patent: Nov. 21, 2000

[54] PROGRESSIVE ADDITION LENSES

[75] Inventors: Edgar V. Menezes, Roanoke; James S. Merritt, Troutville; William Kokonaski, Roanoke, all of Va.

[73] Assignee: Innotech, Inc., Roanoke, Va.

[21] Appl. No.: 09/178,471

[22] Filed: Oct. 23, 1998

[51] Int. Cl.$^7$ .................................................. G02C 7/06
[52] U.S. Cl. ........................................ 351/169; 351/177
[58] Field of Search ................................ 351/168, 169, 351/177

[56] References Cited

U.S. PATENT DOCUMENTS

| | | | |
|---|---|---|---|
| 3,711,191 | 1/1973 | Tagnon | 351/169 |
| 4,055,379 | 10/1977 | Winthrop | 351/169 |
| 4,056,311 | 11/1977 | Winthrop | 351/169 |
| 4,062,629 | 12/1977 | Winthrop | 351/169 |
| 4,253,747 | 3/1981 | Maitenaz | 351/169 |
| 4,461,550 | 7/1984 | Legendre | 351/169 |
| 4,806,010 | 2/1989 | Ewer et al. | 351/169 |
| 4,859,261 | 8/1989 | Ace | 351/169 |
| 4,906,090 | 3/1990 | Barth | 351/169 |
| 4,946,270 | 8/1990 | Guilino et al. | 351/169 |
| 4,952,048 | 8/1990 | Frieder et al. | 351/177 |
| 5,305,028 | 4/1994 | Okano | 351/169 |
| 5,455,642 | 10/1995 | Kato | 351/169 |
| 5,715,032 | 2/1998 | Isenberg | 351/169 |
| 5,771,089 | 6/1998 | Barth | 351/169 |
| 5,844,657 | 12/1998 | Shirayanagi | 351/169 |

FOREIGN PATENT DOCUMENTS

| | | |
|---|---|---|
| 191831 B1 | 1/1989 | European Pat. Off. . |
| 0 578 833 A1 | 2/1993 | European Pat. Off. . |
| 0 809 126 A1 | 11/1997 | European Pat. Off. . |
| 0 414 890 B1 | 1/1998 | European Pat. Off. . |
| 857 993 A2 | 8/1998 | European Pat. Off. . |
| 63-254415 | 10/1988 | Japan . |
| 05303063 | 11/1993 | Japan . |
| 775007 | 5/1957 | United Kingdom . |
| WO 98/12591 | 3/1998 | WIPO . |
| WO 98/22848 | 5/1998 | WIPO . |

*Primary Examiner*—Huy Mai
*Attorney, Agent, or Firm*—Lois Gianneschi

[57] ABSTRACT

The invention provides progressive addition lenses in which lens unwanted astigmatism is reduced and channel width through the intermediate and near vision zones is increased as compared to conventional progressive addition lenses. This result is achieved by combining two or more progressive addition surfaces, which surfaces in combination provide the dioptric add power of the lens.

26 Claims, 3 Drawing Sheets

PROGRESSIVE ADDITION LENSES

FIELD OF THE INVENTION

The present invention relates to multifocal ophthalmic lenses. In particular, the invention provides progressive addition lenses in which unwanted lens astigmatism is reduced without functional compromise of the distance and channel widths through the intermediate and near vision zones, as compared to conventional progressive addition lenses.

BACKGROUND OF THE INVENTION

The use of ophthalmic lenses for the correction of ametropia is well known. For example, multifocal lenses, such as progressive addition lenses ("PAL's"), are used for the treatment of presbyopia. The surface of a PAL provides far, intermediate, and near vision in a gradual, continuous progression of vertically increasing dioptric power from far to near focus, or top to bottom of the lens.

PAL's are appealing to the wearer because PAL's are free of the visible ledges between the zones of differing dioptric power that are found in other multifocal lenses, such as bifocals and trifocals. However, an inherent disadvantage in PAL's is unwanted lens astigmatism, or astigmatism introduced or caused by one or more of the lens' surfaces. Generally, the unwanted lens astigmatism is located on either side of the near vision zone of the lens and, at or near its approximate center, reaches a maximum level that corresponds approximately to the near vision dioptric add power of the lens.

Generally, a PAL with a 2.00 diopter add power and 15 mm channel length will have about a 2.00 diopter maximum, localized unwanted astigmatism. The channel width of the lens will be approximately 6 mm in which the unwanted astigmatism is less than or equal to a 0.75 diopter threshold value.

Any number of lens designs have been tried in attempting to either or both reduce unwanted astigmatism or increase the minimum channel width. However, current state-of-the-art progressive addition lenses provide only minimal decreases in unwanted astigmatism while having large areas in the lenses' peripheries that are unusable due to unwanted astigmatism. Thus, a need exists for a PAL that reduces maximum, localized unwanted astigmatism and, at the same time, provides an increase in the minimum channel width.

BRIEF DESCRIPTION OF THE DRAWINGS

FIG. 1b is an astigmatism map of the lens of FIG. 1a

FIG. 2b is an astigmatism map of the lens of FIG. 2a.

FIG. 4b is an astigmatism map of the lens of FIG. 4a

FIG. 5b is an astigmatism map of a progressive surface of the lens of FIG. 5a.

FIG. 5c is an astigmatism map of a progressive surface of the lens of FIG. 5a.

FIG. 5d is an astigmatism map of the lens of FIG. 5a.

DESCRIPTION OF THE INVENTION AND ITS PREFERRED EMBODIMENTS

Figure 1A:
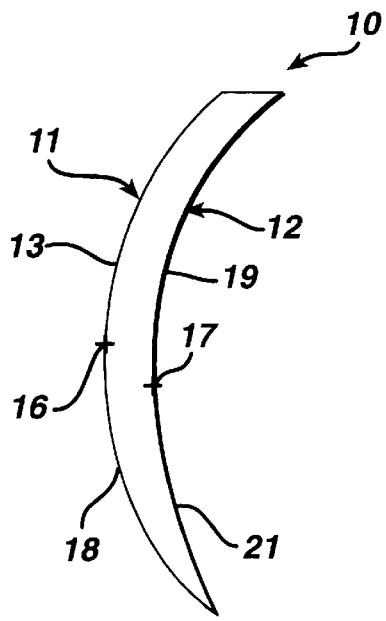
FIG. 1a is a side view of a lens of the invention.

The present invention provides progressive addition lenses, as well as methods for their design and production, in which the maximum, localized unwanted astigmatism that is associated with a given dioptric add power is reduced compared to prior art lenses. Additionally, the distance width, or width about the optical center of the lens that is free of about 0.50 diopters or more of unwanted astigmatism, and minimum channel width of the lens is suitable for use by the lens wearer.

For purposes of the invention, by "channel" is meant the corridor of vision that is free of astigmatism of about 0.75 diopters or greater when the wearer's eye is scanning from the distance zone to the near zone and back. By "lens" or "lenses" is meant any ophthalmic lens including, without limitation, spectacle lenses, contact lenses, intraocular lenses and the like. Preferably, the lens of the invention is a spectacle lens.

It is one discovery of the invention that maximum, localized astigmatism may be reduced by combining two or more progressive addition surfaces each providing a dioptric add power that combines with that of the other surface or surfaces to produce a lens of a higher dioptric add power than that of the surfaces individually. By "dioptric add power" is meant the amount of dioptric power difference between the near and far vision zones of a progressive addition surface. The lens of the invention exhibits less maximum, localized unwanted astigmatism and a wider channel than would be expected by producing a lens with the same dioptric add power using only a single progressive addition surface. Further, it is a discovery of the invention that the use of more than one progressive addition surface ensures that the distance dioptric power and the total dioptric add power needed to correct the wearer's vision are uncompromised. It is yet another discovery of the invention that when the progressive surfaces' dioptric add power areas are misaligned with respect to one another, the resultant total maximum, localized unwanted astigmatism of the lens is less than the sum of the maximum, localized unwanted astigmatism contributed by the individual dioptric add powers of each progressive addition surface.

By "progressive addition surface" is meant a continuous, aspheric surface having far and near vision zones and a zone of increasing dioptric power connecting the far and near vision zones. By "maximum, localized unwanted astigmatism" is meant the highest, measurable level of astigmatism in an area of unwanted astigmatism on a lens surface.

In one embodiment, the lens of the invention comprises, consists essentially of, and consists of: a.) a first progressive addition surface having one or more areas of maximum, localized unwanted astigmatism and a first dioptric add power; and b.) a second progressive addition surface having one or more areas of maximum, localized unwanted astigmatism and a second dioptric add power, the progressive addition surfaces disposed in relation to each other so that a portion or all of the areas of maximum, localized unwanted astigmatism are misaligned and wherein the dioptric add power of the lens is about the sum of the first and second dioptric add powers.

In another embodiment, the invention provides a process for producing a lens comprising, consisting essentially of, and consisting of the steps of: a.) providing at least a first and a second progressive addition surface, the first progressive addition surface having one or more areas of maximum, localized unwanted astigmatism and a first dioptric add power and the second progressive addition surface having one or more areas of maximum, localized unwanted astigmatism and a second dioptric add power; and b.) disposing the first and second progressive addition surfaces so that a portion or all of the areas of maximum, localized unwanted astigmatism are misaligned and the dioptric add power of the lens is about the sum of the first and second dioptric add powers.

By "misaligned" is meant that the surfaces, and thus the areas of unwanted astigmatism, are arranged or disposed in relation to one another so that a portion or all of the areas of maximum, localized unwanted astigmatism of one surface do not substantially coincide with one or more areas of maximum, localized unwanted astigmatism of the other surface. Preferably, the misalignment is such that no area of maximum, localized unwanted astigmatism of a surface substantially coincides with that of the other surface.

The progressive addition surfaces used in the lens of the invention may be misaligned by any of a number of methods. For example, the optical centers of the surfaces may be shifted either or both laterally or vertically with respect to each other. By "optical center" is meant the point on a surface intersected by the optical axis of the lens. One ordinarily skilled in the art will recognize that, if the optical centers are shifted laterally, the minimum channel width is reduced by the extent of the shift. Thus, a progressive addition lens design using a lateral shift preferably uses progressive addition surfaces with wider channel widths to compensate for the diminution in channel width caused by the shift.

Alternatively, if the optical centers of the surfaces are shifted vertically, the channel length will be increased. By "channel length is meant the distance along the central meridian of the surface between the optical center and the top end of the near vision zone. Thus, a design using such a shift preferably uses progressive addition surfaces with shorter channel lengths in compensation.

As yet another alternative, maintaining the optical centers of the progressive surfaces coincident with each other, the centers may be rotated with respect to one another. In a preferred embodiment, each surface is designed so that it is asymmetric about the center line of its channel. In this case, the areas of maximum, localized unwanted astigmatism of the surfaces do not substantially coincide on rotation of the optics about an axis joining the surfaces' optical centers. By "asymmetric" is meant that the power and astigmatism maps of the surface are asymmetric about the center meridian of the surface.

The lateral and vertical shifts are done in such a way as to preserve the distance and near vision dioptric powers of the lens. In order to minimize the introduction of lens prism power, the shifts must occur so that the optical center of one progressive addition surface is shifted along a curve that is parallel to the distance curve of the other progressive addition surface. In the case of rotations, the surfaces are rotated about their optical centers so that the distance and near powers are substantially unaffected. One ordinarily skilled in the art will recognize that the rotational misalignment may be in addition to the misalignment carried out for purposes of reducing unwanted astigmatism.

The amount of misalignment, or the vertical shift, lateral shift or rotation of optical centers, is an amount sufficient to prevent substantial superposition, or coincidence, of the maximum, localized unwanted astigmatism areas of the progressive addition surfaces. More specifically, it is believed that the misalignment leads to a mismatch of the direction of the astigmatic vectors associated with one surface relative to the corresponding astigmatic vectors of the other surface resulting in the total maximum, localized unwanted astigmatism for the final lens being less than that if the vectors were aligned. The lateral or vertical shift may be about 0.1 mm to about 10 mm, preferably about 1.0 mm to about 8 mm, more preferably about 2.0 mm to about 4.0 mm. Rotational shifts may be about 1 to about 40 degrees, preferably about 5 to about 30 degrees, more preferably about 10 to about 20 degrees.

As yet another alternative for misalignment, each surface may be designed so that the channel length of the surfaces are of different lengths. In this embodiment, the areas of maximum, localized, unwanted astigmatism of the surfaces do not align when the optical centers of the surfaces are brought into alignment. As a result, the unwanted astigmatism is reduced compared to a lens of the same total dioptric add power. The greater the difference between the channel lengths, the greater will be the reduction in maximum, localized unwanted astigmatism. However, the channel lengths must not be so large as to produce a mismatch in the near vision zones so that the near vision of the lens wearer is compromised. The lens resulting from this embodiment will have a channel length falling between that of each surface and dependent upon the dioptric add power contributed by each surface to the total dioptric add power of the lens. The channel length difference between the surfaces may be about 0.1 mm to about 10 mm, preferably about 1 mm to about 7 mm, more preferably about 2 mm to about 5 mm.

The progressive addition surfaces may each be independently on the convex or concave surface of the lens or in a layer between the outer concave and outer convex surfaces of the lens. Other surfaces, such as spheric and toric surfaces, designed to adapt the lens to the ophthalmic prescription of the lens' wearer may be used in combination with, or in addition to, one or more of the progressive addition surfaces.

For example, a progressive addition surface may be combined with a toric surface, such as concave surface that is a progressive addition surface and has a cylinder power at a particular axis. In this case, a dioptric add power and cylinder power need not be provided at every axis combination desired for the lens. Rather, it has been discovered that, because dioptric add power decreases relatively slowly when one moves horizontally away from the center of the add zone to the lens periphery, a rotational misalignment of surfaces of up to about + or –25, preferably + or –20, more preferably + or –15 degrees may be used while still achieving the desired dioptric add power for the lens.

The dioptric add power of each of the progressive addition surfaces used in the invention is selected so that the sum of their dioptric add powers is substantially equal to the value needed to correct the lens wearer's near vision acuity. Additionally, the dioptric add power of each surface is selected in view of the maximum, localized unwanted astigmatism associated with a given near dioptric power. The dioptric add power of the progressive addition surfaces may be each independently from about +0.01 diopters to about +3.00 diopters, preferably from about +0.25 diopters to about +2.00 diopters, more preferably about +0.50 to about +1.50 diopters.

Similarly, the distance and near dioptric powers for each surface are selected so that the contribution of the powers is the value needed to correct the wearer's distance and near vision. Generally, the distance dioptric power for each surface will be within the range of about 0.25 diopters to about 8.50 diopters. Preferably, the dioptric power of the distance zone of the concave surface may be + or – about 2.00 to about 5.50 diopters and for the convex surface, + or – about 0.5 to about 8.00 diopters. The near vision dioptric power for each of the surfaces will be about 1.00 diopters to about 12.00 diopters.

The progressive addition surfaces and lenses of the invention may be formed by any convenient method such as, without limitation, thermoforming, molding, grinding, casting or the like. In a preferred method, an optical preform having a progressive addition surface is used and a second progressive addition surface is cast onto the preform. In a more preferred method, a preform the concave surface of which is a progressive addition surface with a base spherical power and a cylinder power is used and a progressive addition surface is formed on the front surface by any convenient method, preferably by casting and more preferably by surface casting.

The invention will be clarified further by a consideration of the following, non-limiting examples.

EXAMPLES

Example 1

Referring to FIG. 1a, lens 10 of the invention is shown having convex progressive addition surface 11 and concave progressive addition surface 12. Surface 11 has distance zone 13 with a curvature of 6.00 diopters and near zone 18 with a curvature of 7.00 diopters. Surface 12 has distance zone 19 with a curvature of 6.00 diopters and near zone 21 with a curvature of 5.00 diopters. The resulting distance power of the lens is 0.00 diopters and the dioptric add power of the lens is 2.00 diopters, 1.00 diopters contributed by each of surfaces 11 and 12. As shown in FIG. 1a, the convex and concave optical centers 16 and 17, respectively, are shifted with respect to each other by 4.0 mm.

Figure 1B:
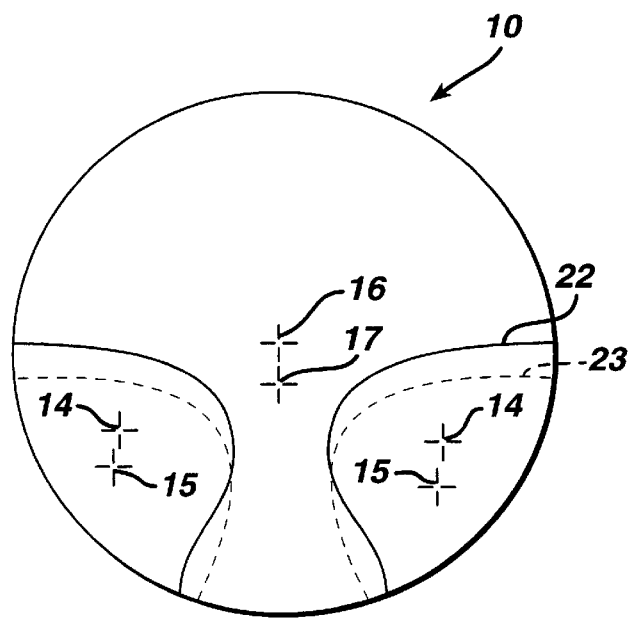

FIG. 1b is an astigmatism map of lens 10 illustrating the misalignment of the surfaces. Areas 22 and 23 are of the unwanted astigmatism for surfaces 11 and 12, respectively. The locations of the maximum, localized astigmatism 14 and 15 do not overlap and, thus, are not additive. The maximum, localized unwanted astigmatism value of 1.90 D for this lens is shown in Table 1 and is significantly lower than the 2.20 D that is found in a conventional PAL of the same near dioptric power.

TABLE 1

| Example | Add Power Front (D) | Add Power Back (D) | Add Power Total (D) | Vertical Shift (mm) | Max. Astigmatism (D) | Max. Astig./ Add Ratio |
|---|---|---|---|---|---|---|
| Prior Art | 2.00 | 0.00 | 2.00 | 0.0 | 2.20 | 1.10 |
| 1 | 1.00 | 1.05 | 2.00 | 4.0 | 1.90 | 0.90 |
| 2 | 1.05 | 1.05 | 2.10 | 8.0 | 1.90 | 0.90 |

Example 2

A lens with two progressive addition surfaces is used, the misalignment for which is 8.00 mm. The misalignment results in a reduction of maximum localized unwanted astigmatism of 0.30 D compared to the prior art Lens of Table 1.

Example 3

Figure 2A:
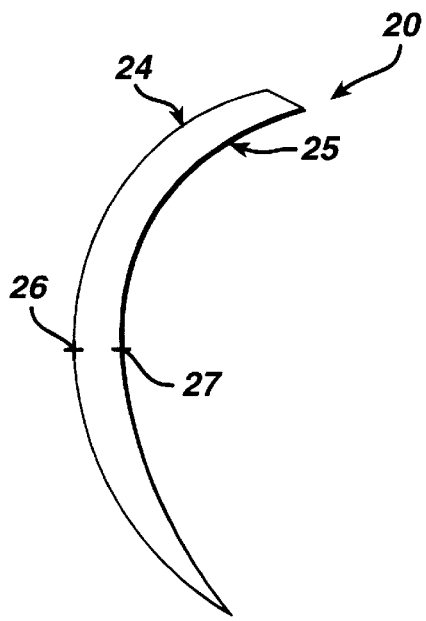
FIG. 2a is a side view of a lens of the invention.
Figure 2B:
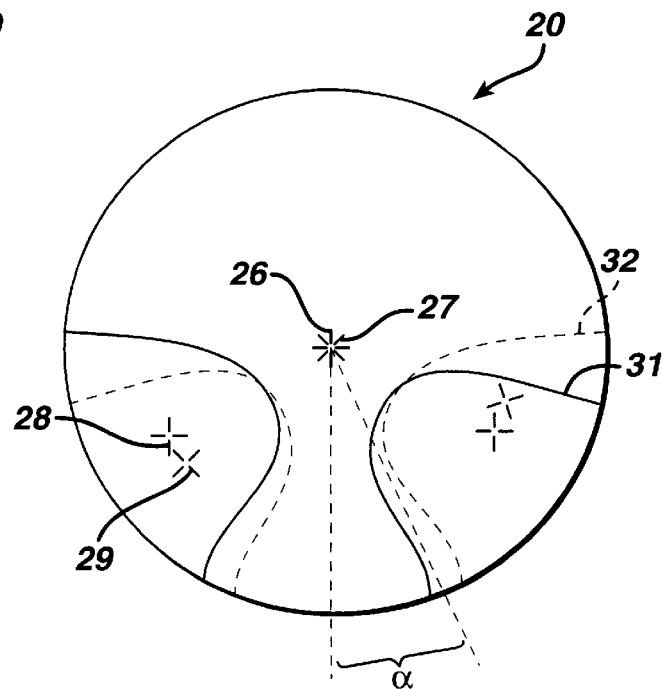

As shown in FIGS. 2a and 2b, lens 20 with a concave progressive addition surface 25 is seen. Surface 25 has distance and near zone curvatures of 6.00 and 5.00 diopters, respectively. Convex surface 24 with distance and near zone curvatures of 6.00 and 7.00 diopters is also shown. The optical center 27 of surface 25 is rotated by a, an amount of 10 degrees, with respect to that of optical center 26 of convex progressive surface 24. In FIG. 2b, the astigmatism map of lens 20 is shown. Areas 31 and 32 depict the areas of unwanted astigmatism for surfaces 24 and 25, respectively. Maximum, localized unwanted astigmatism areas 28 and 29 for surfaces 24 and 25, respectively, are also shown. Table 2 shows that the resulting lens has a maximum, localized unwanted astigmatism of 1.90 diopters as compared to 2.20 diopters for a prior art lens.

TABLE 2

| Example | Add Power Front (D) | Add Power Back (D) | Add Power Total (D) | Rotational Shift (deg.) | Max. Astigmatism (D) | Max. Astig./Add Ratio |
|---|---|---|---|---|---|---|
| Prior Art | 2.00 | 0.00 | 2.00 | 0.0 | 2.20 | 1.10 |
| 3 | 1.00 | 1.00 | 1.90 | 10.0 | 1.90 | 1.00 |
| 4 | 1.00 | 1.00 | 1.95 | 20.0 | 1.85 | 0.95 |
| 5 | 1.00 | 1.00 | 1.85 | 30.0 | 1.75 | 0.95 |
| 6 | 1.00 | 1.00 | 1.85 | 40.0 | 1.41 | 0.76 |

Examples 4–6

The concave progressive addition surface of a lens is rotated around its optical center by 20, 30, and 40 degrees with respect to the convex progressive addition surface. The rotations result in maximum, localized unwanted astigmatisms of 1.85, 1.75, and 1.41 diopters, respectively as listed on Table 2.

Example 7

Figure 3:
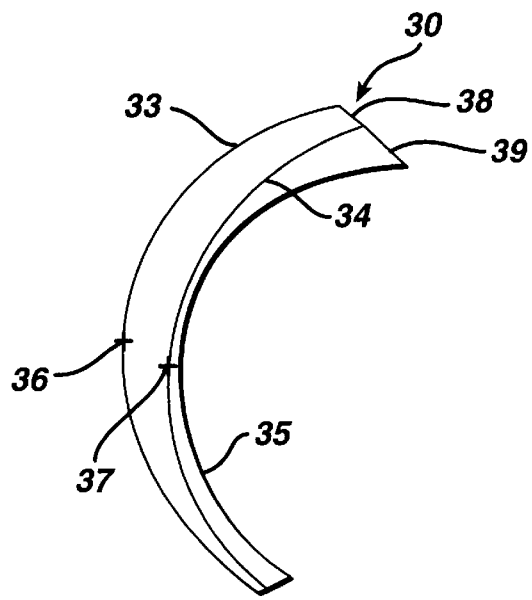
FIG. 3 is a side view of a lens of the invention.

FIG. 3 depicts a concave progressive addition surface 34 placed between surfaces 33 and 35 of lens 30. Lens 30 is made of an optical preform 38 having a refractive index of 1.60 and a cast layer 39 having a refractive index of 1.50. Convex surface 33 of preform 38 has optical center 36, a distance curvature of 6.50 diopters and a near curvature of 8.50 diopters. Concave surface 34 of preform 38 has optical center 37, a distance curvature ("DC") of 6.50 diopters and a near curvature ("NC") of 0.50 diopters derived by the formula:

$$NC = DC - \text{add power} \times \frac{n_1 - 1.00}{n_1 - n_2}$$

wherein $n_1$ is the refractive index of optical preform 38 and $n_2$ is the refractive index of layer 39. Optical center 37 is shifted vertically downwards 4 mm with respect to optical center 36. Concave surface 35 of layer 39 includes a cylindrical power of −2.00 D for correcting the wearer's astigmatism. Lens 30 has a distance power of 0.00 diopters, a total dioptric add power of 3.00 diopters, arrived at by the 2.00 diopter dioptric add power of surface 33 and the 1.00 diopters dioptric add power of surface 34 combined. The maximum, localized unwanted astigmatism is lower than that of a conventional lens with a 3.00 diopters dioptric add power.

Example 8

Figure 4A:
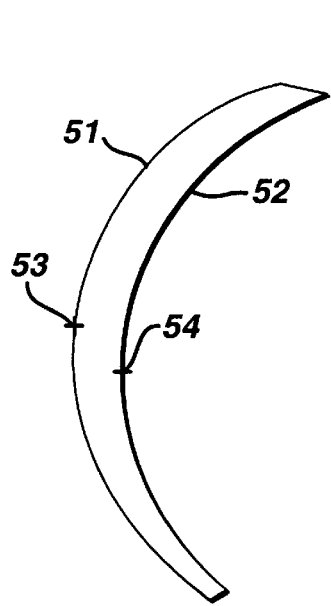
FIG. 4a is a side view of the lens of the invention.
Figure 4B:
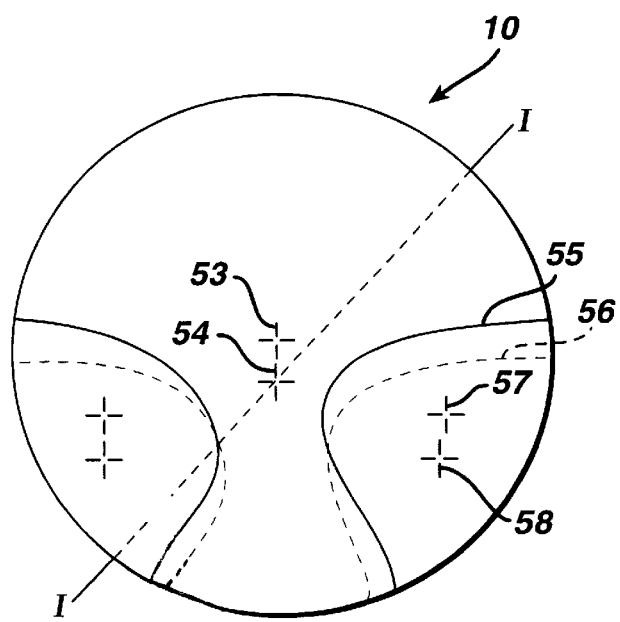

In FIG. 4a is depicted lens 50 having convex surface 51 and concave surface 52. Surface 51 is a progressive addition surface with optical center 53. Surface 52 is a combination progressive addition-toric surface having optical center 54 shifted vertically downwards 4 mm with respect to optical center 53. FIG. 4b depicts the astigmatism map for lens 50 showing the shift. Areas 55 and 56 are the areas of unwanted astigmatism, 57 and 58 being their respective maximum, localized unwanted astigmatism areas respectively, for surfaces 51 and 52. I-I is the toric axis for surface 52. The overlap of the progressive addition surfaces are such that, although the near and distance vision zones are preserved, the location of the maximum, localized unwanted astigmatisms 57 and 58 of each surface do not coincide and, thus, their effect is not additive.

Example 9

Figure 5A:
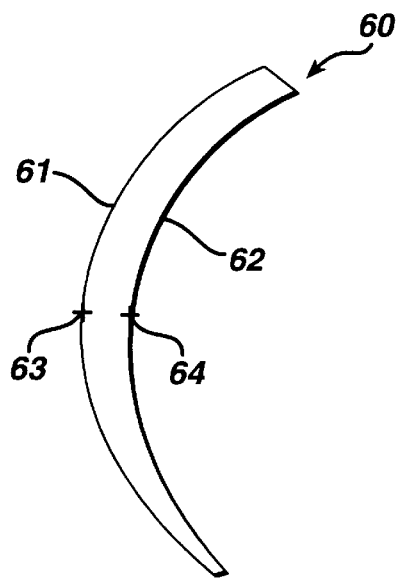
FIG. 5a is a side view of a lens of the invention.
Figure 5D:
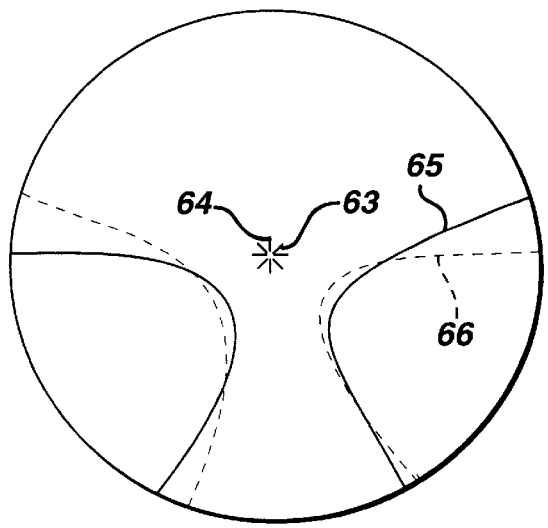
Figure 5B:
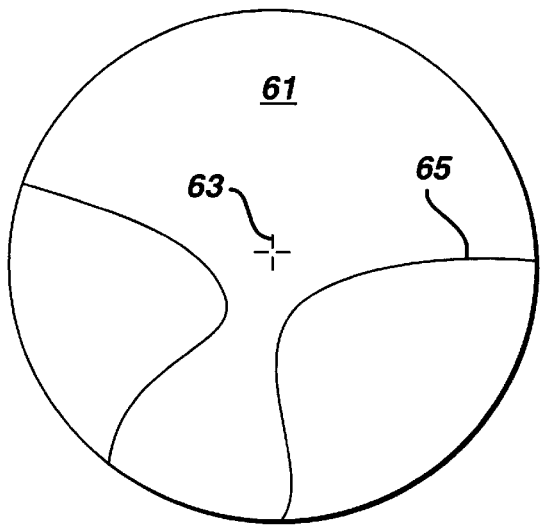
Figure 5C:
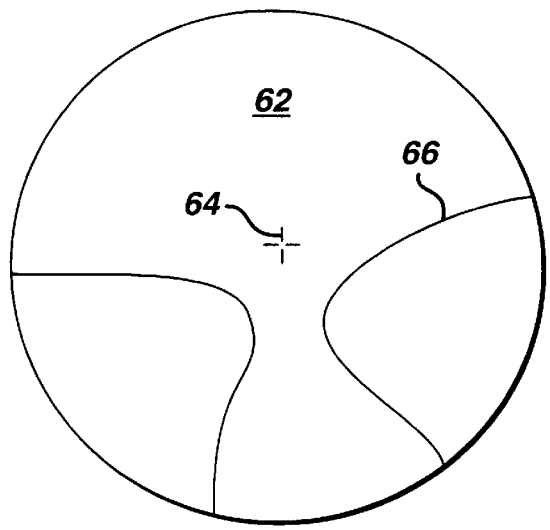

Lens 60 is depicted in FIG. 5a in which a left oriented, convex progressive addition surface 61 shown combined with a right oriented, concave progressive addition surface 62. Each surface is depicted individually in FIGS. 5b and 5c, respectively. Optical centers 63 and 64 of each surface are rotated so as to become optically aligned. In FIG. 5d is depicted that the left and right orientation of the surfaces provides misalignment of the unwanted astigmatism areas 65 and 66 of surfaces 61 and 62, respectively. The maximum, localized unwanted astigmatism for lens 60 of 1.70 diopters listed on Table 3.

TABLE 3

| Example | Add Power Front (D) | Add Power Back (D) | Add Power Total (D) | Max. Astigmatism (D) | Max. Astig./Add Ratio |
|---------|---------------------|--------------------|--------------------|----------------------|----------------------|
| Prior Art | 2.02 | 0.00 | 2.02 | 2.20 | 1.10 |
| 9 | 1.00L | 1.00R | 2.10 | 1.70 | 0.81 |

Example 10

An optical preform is produced containing a spherical convex surface with a curvature of 6.00 diopters. The preform's concave surface is a toric progressive surface with a base spherical curvature of 6.00 diopters, a cylinder curvature of 4.00 diopters at an axis placed at the 0–180 axis, and a near vision zone with an add power of 1.00. The near vision zone is placed on the concave toric surface of the preform at 11.25 degrees clockwise from the bottom of the lens (the 270 degree axis). The resultant preform has a 0.00 diopter distance power, a −2.00 diopter cylinder power at an axis of 0 degrees and a 1.00 diopter add power. A progressive addition glass mold with a 6.00 diopter base curvature and a 1.00 diopter add power placed at the 270 degree axis is used to surface cast a UV curable resin layer on the convex surface of the preform using conventional surface casting techniques. The resultant lens has a distance power of 0.00 diopters, a cylinder of −2.00 diopters at 0 degree axis, an add power of 2.00 diopters. The 11.25 degree misalignment of the front and back add powers results in a reduction of maximum, localized unwanted astigmatism relative to a prior art lens.

What is claimed is:

1. A lens comprising a first progressive addition surface having one or more areas of maximum, localized unwanted astigmatism and a first dioptric add power and second progressive addition surface having one or more areas of maximum, localized unwanted astigmatism and a second dioptric add power, the progressive addition surfaces disposed in relation to each other so that a portion or all of the areas of maximum, localized unwanted astigmatism are misaligned and wherein the dioptric add power of the lens is about the sum of the first and second dioptric add powers.

2. The lens of claim 1, wherein the surfaces are disposed so that a portion of the areas of maximum, localized unwanted astigmatism are misaligned.

3. The lens of claim 1, wherein the surfaces are disposed so that all of the areas of maximum, localized unwanted astigmatism are misaligned.

4. The lens of claim 1, wherein the progressive addition surfaces are misaligned so that the optical centers of the surfaces are shifted vertically, laterally, or a combination thereof with respect to each other.

5. The lens of claim 1, wherein the progressive addition surfaces are misaligned so that the optical centers of the surfaces are rotated with respect to each other.

6. The lens of claim 5, wherein the progressive addition surfaces are asymmetric.

7. The lens of claim 1, wherein the first and second progressive addition surfaces each further comprises a channel having a channel length, the length of the first progressive surface channel being of a different length than that of the second progressive addition surface.

8. The lens of claim 1, further comprising a concave surface and a convex surface, the first progressive addition surface being on the concave surface and the second progressive addition surface being on the convex surface.

9. The lens of claim 1, further comprising a concave surface, a convex surface, and layer therebetween, the first progressive addition surface being on the concave surface or the convex surface and the second progressive addition surface being in the layer between the concave and convex surfaces.

10. A spectacle lens comprising a first progressive addition surface having one or more areas of maximum, localized unwanted astigmatism and a first dioptric add power and second progressive addition surface having one or more areas of maximum, localized unwanted astigmatism and a second dioptric add power, the progressive addition surfaces disposed in relation to each other so that a portion or all of the areas of maximum, localized unwanted astigmatism are misaligned and wherein the dioptric add power of the lens is about the sum of the first and second dioptric add powers.

11. The spectacle lens of claim 10, wherein the surfaces are disposed so that a portion of the areas of maximum, localized unwanted astigmatism are misaligned.

12. The spectacle lens of claim 10, wherein the surfaces are disposed so that all of the areas of maximum, localized unwanted astigmatism are misaligned.

13. The spectacle lens of claim 10, wherein the progressive addition surfaces are misaligned so that the optical centers of the surfaces are shifted vertically, laterally, or a combination thereof with respect to each other.

14. The spectacle lens of claim 11 or 12 wherein the progressive addition surfaces are misaligned so that the optical centers of the surfaces are vertically shifted about 0.1 mm to about 10 mm with respect to each other.

15. The spectacle lens of claim 11 or 12, wherein the progressive addition surfaces are misaligned so that the optical centers of the surfaces are laterally shifted about 0.1 mm to about 10 mm with respect to each other.

16. The spectacle lens of claim 11 or 12, wherein the progressive addition surfaces are misaligned so that the optical centers of the surfaces are vertically and laterally shifted with respect to each other, each shift being independently about 0.1 mm to about 10 mm.

17. The lens of claim 11 or 12 wherein the progressive addition surfaces are misaligned so that the optical centers of the surfaces are rotated about 1 to about 40 degrees with respect to each other.

18. The lens of claim 17, wherein the progressive addition surfaces are asymmetric.

19. The lens of claim 10, wherein the first and second progressive addition surfaces each further comprises a channel having a channel length, the length of the first progressive surface channel being of a different length than the channel length of the second progressive addition surface, the difference in channel length being about 0.1 mm to about 10 mm.

20. The lens of claim 10, further comprising a concave and a convex surface, the first progressive addition surface being on the concave surface and the second progressive addition surface being on the convex surface.

21. The lens of claim 10, further comprising a concave surface, a convex surface, and layer therebetween, the first progressive addition surface being on the concave surface or the convex surface and the second progressive addition surface being in the layer between the concave and convex surfaces.

22. A process for producing a lens comprising the steps of:
providing at least a first and a second progressive addition surface, the first progressive addition surface having one or more areas of maximum, localized unwanted astigmatism and a first dioptric add power and the second progressive addition surface having one or more areas of maximum, localized unwanted astigmatism and a second dioptric add power, and disposing the first and second progressive addition surfaces so that all or a portion of the areas of maximum, localized unwanted astigmatism are misaligned and the dioptric add power of the lens is about the sum of the first and second dioptric add powers.

23. The process of claim 22, wherein the misalignment of the surfaces is achieved by shifting the optical centers of the surfaces with respect to each other, rotating the optical centers of the surfaces with respect to each other, or providing each of the surfaces with a channel having a channel length that differs from that of the other surface.

24. The process of claim 22, wherein the misalignment of the surfaces is achieved by shifting the optical centers of the surfaces vertically or laterally with respect to each other.

25. The process of claim 22, wherein the misalignment of the surfaces is achieved by rotating the optical centers of the surfaces with respect to each other.

26. The process of claim 22, wherein the misalignment of the surfaces is achieved by providing each of the surfaces with a channel having a channel length that differs from that of the other surface.

* * * * *